US012377692B2

(12) United States Patent
Abramov (10) Patent No.: US 12,377,692 B2
(45) Date of Patent: Aug. 5, 2025

(54) CONNECTOR DEVICE FOR CONNECTING A VEHICLE TO ANOTHER VEHICLE, A MOTORIZED TOW DOLLY AND A VEHICLE MODULARLY CONNECTABLE TO MULTIPLE ADDITIONAL VEHICLES (71) Applicant: D.S. RAIDER Ltd., Kefar-Saba (IL)

(72) Inventor: Erez Abramov, Moshav Hagor (IL)

(73) Assignee: D.S. RAIDER LTD., Kefar-Saba (IL)

( * ) Notice: Subject to any disclaimer, the term of this patent is extended or adjusted under 35 U.S.C. 154(b) by 781 days.

(21) Appl. No.: 17/673,295

(22) Filed: Feb. 16, 2022

(65) Prior Publication Data
US 2022/0258550 A1    Aug. 18, 2022

Related U.S. Application Data (60) Provisional application No. 63/149,897, filed on Feb. 16, 2021.

(51) Int. Cl.
*B60D 1/07* (2006.01)
*B60D 1/167* (2006.01)
*B60D 1/173* (2006.01)

(52) U.S. Cl.
CPC ............... *B60D 1/07* (2013.01); *B60D 1/167* (2013.01); *B60D 1/173* (2013.01)

(58) Field of Classification Search
CPC ............................... B60D 1/1481; B60P 3/127
See application file for complete search history.

(56) References Cited

U.S. PATENT DOCUMENTS

| 3,717,364 | A | 2/1973 | McClive |
| 4,645,226 | A | 2/1987 | Gustavsson et al. |
| 4,892,166 | A | 1/1990 | Gaffney |
| 5,364,117 | A | 11/1994 | Keith |
| 5,489,111 | A | 2/1996 | Collins |
| 7,694,993 | B2 | 4/2010 | Timmons, Jr. |
| 9,073,535 | B2 * | 7/2015 | Jenkins, Jr. ............ B60W 20/00 |
| 11,648,970 | B2 * | 5/2023 | Gibson ..................... B62B 1/12 |
| | | | 280/47.18 |
| 2003/0192711 | A1 | 10/2003 | Heller |

(Continued)

FOREIGN PATENT DOCUMENTS

| DE | 202017001959 U1 | 4/2017 |
| FR | 3027257 A1 | 4/2016 |

(Continued)

*Primary Examiner* — Kevin Hurley
(74) *Attorney, Agent, or Firm* — FISHERBROYLES, LLP; Roger L. Browdy; James E. Mrose (57) ABSTRACT

A connector device for connecting a first vehicle to a second vehicle, the connector device comprising an upper frame and a lower frame, where the rear side of the upper frame is configured to pivotally connect to the front upper side of the second vehicle, about a first rotation axis, and the rear side of the lower frame is configured to pivotally connect to the front lower side of the second vehicle, about a second rotation axis that is angular in respect to the first rotation axis. The non-zero angle formed between the rotation axes restricts the rotation movements at least about one of these axes. The connector device can be used for forming a removable chain of main and towed vehicle(s) in a manner that enables folding of a towed vehicle over the first vehicle and removably connecting as many vehicles to be towed as required.

12 Claims, 6 Drawing Sheets (56) References Cited

U.S. PATENT DOCUMENTS

2009/0162168 A1   6/2009   Fast
2015/0306946 A1   10/2015   Jenkins, Jr. et al.
2018/0125008 A1   5/2018   Borshov et al.

FOREIGN PATENT DOCUMENTS

GB   536882 A   5/1941
WO   2010006417 A1   1/2010
WO   2018127718 A2   7/2018

* cited by examiner

CONNECTOR DEVICE FOR CONNECTING A VEHICLE TO ANOTHER VEHICLE, A MOTORIZED TOW DOLLY AND A VEHICLE MODULARLY CONNECTABLE TO MULTIPLE ADDITIONAL VEHICLES

The present disclosure relates in general to devices, apparatuses, carriers, vehicles and tow dollies for connecting vehicles to one another.

BACKGROUND

Tow dollies also named "trailers" or "dollies" often include a built-in connecting structure such as a connecting arm, for connecting to a rear side of a vehicle, to enable the dolly to be towed by that vehicle.

Vehicles such as trucks, pickup trucks, 4×4 vehicles etc., towing trailers, etc., typically include or enable installation of a rear trailer hitch for connecting thereby to a tow dolly or a carrier for towing loads loaded thereon.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIGS. 1A and 1B show a connector device for connecting a tow dolly to a vehicle or to another similarly/differently designed other tow dolly, the connector device having two upper catenating pieces configured for enabling pivotal movement of the apparatus about a first axis and a lower catenating piece that enables pivotal movement about a second axis that is perpendicular to the first axis, according to some embodiments.

FIGS. 3A-3C show the vehicle, according to some embodiments.

DETAILED DESCRIPTION

Aspects of disclosed embodiments pertain to a connector device, for connecting a first vehicle to a second vehicle or to any other device and/or facility.

According to embodiments, the connector device may include an upper frame and a lower frame, where the rear side of the upper frame is configured to pivotally connect to the front upper side of the second vehicle, about a first rotation axis, and the rear side of the lower frame is configured to pivotally connect to the front lower side of the second vehicle, about a second rotation axis that is angular in respect to the first rotation axis.

The non-zero angle formed between the rotation axes may be adapted and/or used to restrict at least part of the rotation movements at least about one of these rotation axes.

The connector device can be used for forming a removable chain of main and towed vehicle(s) in a manner that enables folding of a towed vehicle over the first vehicle and removably connecting as many vehicles to be towed as required.

The first vehicle may be any road vehicle and may be adapted to connecting (e.g. removably connecting) to the connector device at a rear and/or front side thereof. The first vehicle may be, for example, a tow truck, a four-wheeled vehicle, a two-wheeled vehicle, a tow dolly, a carrier, a train car, a wagon, and the like. The first and/or second vehicle for connecting via the connector device, may be manned or unmanned, remotely controllable and/or autonomous, and the like.

According to some embodiments, the connector device may have an upper frame and a lower frame attached to one another, forming or attached to upper and lower catenating pieces e.g. for connecting the upper frame of the connector device to an upper side of the second vehicle and a lower part of the connector device to a lower portion of the second vehicle. The lower part/side being lower in respect to the upper part/side in respect to a ground level. The upper and lower catenating pieces may be configured to enable pivotal movement of the connector apparatus in respect to the vehicle in different pivot axes that are angular to one another (forming a non-zero angle therebetween—e.g. perpendicular to one another).

According to some embodiments, the upper frame may include one or more catenating pieces each enabling an upper part of the second vehicle, connecting thereto, to rotate about a "y" axis that may be parallel to a ground plane over which the first vehicle, to which the connector device connects, is located. This is done to allow a folding/unfolding movement of the connecting piece such that will enable the second vehicle to fold towards/away from a back upper side of the first vehicle.

According to some embodiments, the lower frame may include at least one lower catenating piece configured for enabling a lower part of the second vehicle, connecting thereto, to rotate about a "z" axis which may be angular (e.g. perpendicular) to the "y" axis.

Since the rotation axes "z" and "y" are angular to one another (e.g. perpendicular to one another), and since the two upper and lower frames of the connector device are attached to each other, e.g. as a single integral piece or fixedly connected to one another, the freedom of rotational movement about each of the axes "z" and "y" is limited or restricted e.g. since the rotation about the "z" axis is restricted by the upper catenating piece(s) of the upper frame (only enabling rotation about the "y" axis) and the rotation about the "y" axis is restricted by the lower catenating piece(s) of the lower frame (only enabling rotation about the "z" axis).

According to some embodiments, the lower catenating piece(s) of the lower frame of the connector device may be configured for connecting to the lower part of the second vehicle via a connecting element that can be removed for removing the rotational movement restriction about the "y" axis, e.g. for enabling folding of the second vehicle over the first vehicle for any purpose such as for storage of the first and second vehicles.

According to some embodiments, the front side of the connector device may include any kind of connecting element(s) and/or configuration to connect to a rear side of the first vehicle.

According to some embodiments, the first vehicle may be any manned or unmanned vehicle and the second vehicle may be a tow dolly, where the tow dolly may be configured to connect at least at one (e.g. front) side thereof to the connector device via the upper and lower catenating pieces.

The term "tow dolly" or "dolly" may be used interchangeably herein and may refer to any wheeled trailer, device, apparatus, structure, carrier and/or vehicle that can be directly or indirectly towed by any other vehicle. The dolly may be motorized or un-motorized.

For example, a tow dolly, used as a vehicle directly or indirectly (e.g. in catenation) to the first vehicle, may include one or more self-carried motors and/or one or more self-carried power supply units such as one or more batteries.

According to some embodiments, each battery may be connectable to one or more motors of the vehicle and/or of the dolly for example for adding battery power or replaceable power to the motor(s) of the vehicle and/or to power the motor(s) of the dolly.

In some embodiments, the motor(s) of the second vehicle, or any other additional vehicle chain-connected indirectly to the first vehicle (herein also "one or more additional vehicles"), may be configured for wireless and/or wire-based communication with a control box/unit of the first vehicle for enabling controlling the second/additional vehicle, through the first vehicle, e.g. by wirelessly/wire-based transmittal of command signals from the control box of the vehicle to the motor(s) of the second/additional vehicle. The communication between the first vehicle's control box and the one or more additional vehicles towed thereby, may also enable receiving sensor(s) data from the one or more additional vehicles (e.g. in embodiments in which at least one of the one or more additional vehicles have one or more sensors installed thereover, for sensing one or more physical characteristics of the second/additional vehicle, the road, the load it carried, etc.), for example, for controlling the first and/or the one or more additional vehicles, based on received sensor(s) data.

In some embodiments the first vehicle may also have one or more sensors installed therein/thereover configured for sensing one or more physical characteristics such as characteristics of the first vehicle, the one or more towed vehicles and/or load carried thereby, driving conditions, the driver, etc. for improving and/or enabling automatic or semi-automatic vehicle(s) drive-control.

According to some embodiments, the sensors may also enable one or more of:

providing indications (e.g. alerts) to the driver or a remote user/computerized controller of the vehicles' condition (including for example, road and/or weather conditions, technical functionality related information, alarming/hazardous conditions, where the conditions may be deduced by analysis of the received sensors data;

remotely-controlled, autonomous or semi-autonomous driving of the first vehicle and the one or more additional vehicles towed thereby (e.g. also based on sensors data analysis and driving programs responsive to the sensors data analysis).

Figure 1A:
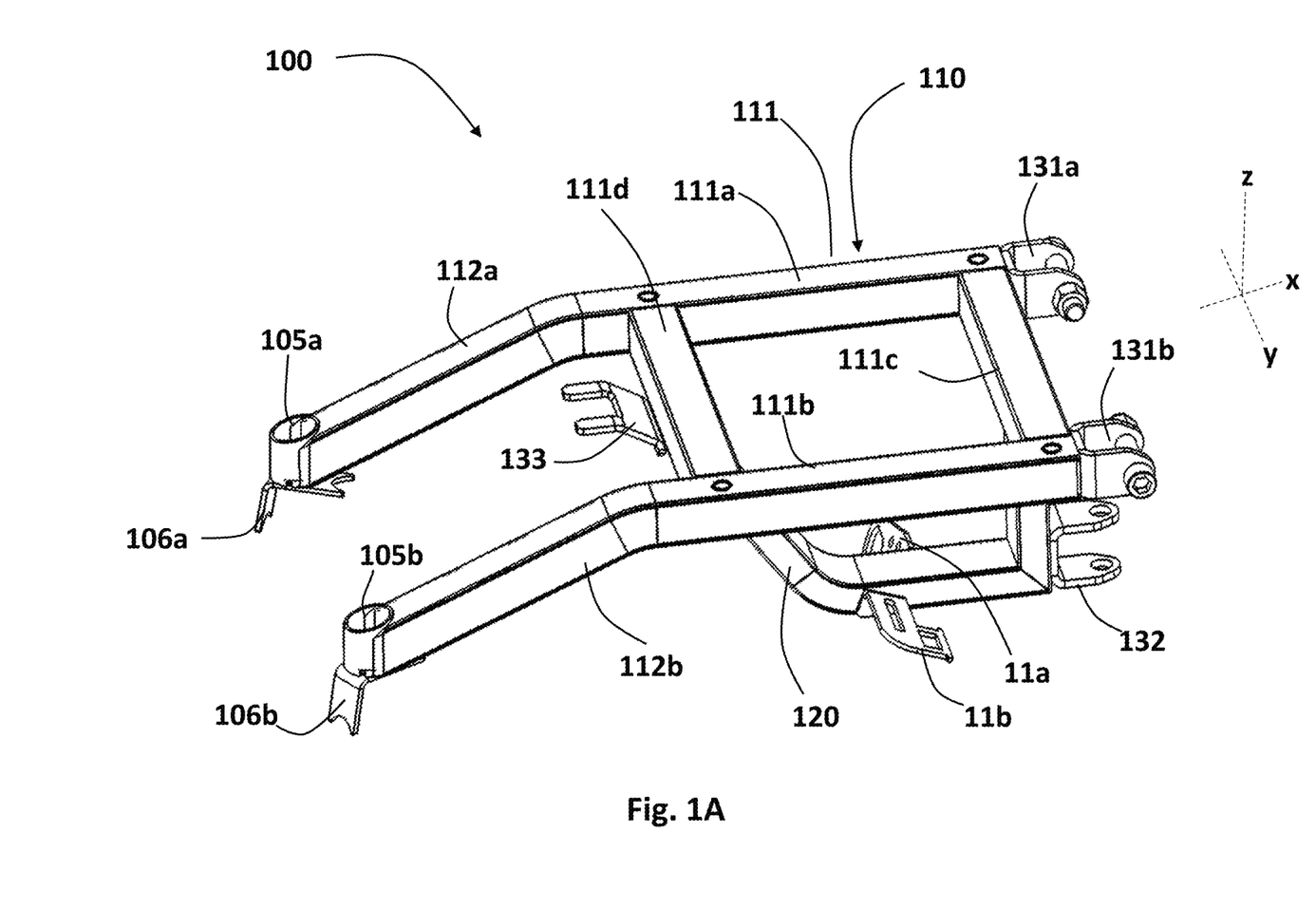
FIG. 1A shows an elevated isometric view of the tow dolly.
Figure 1B:
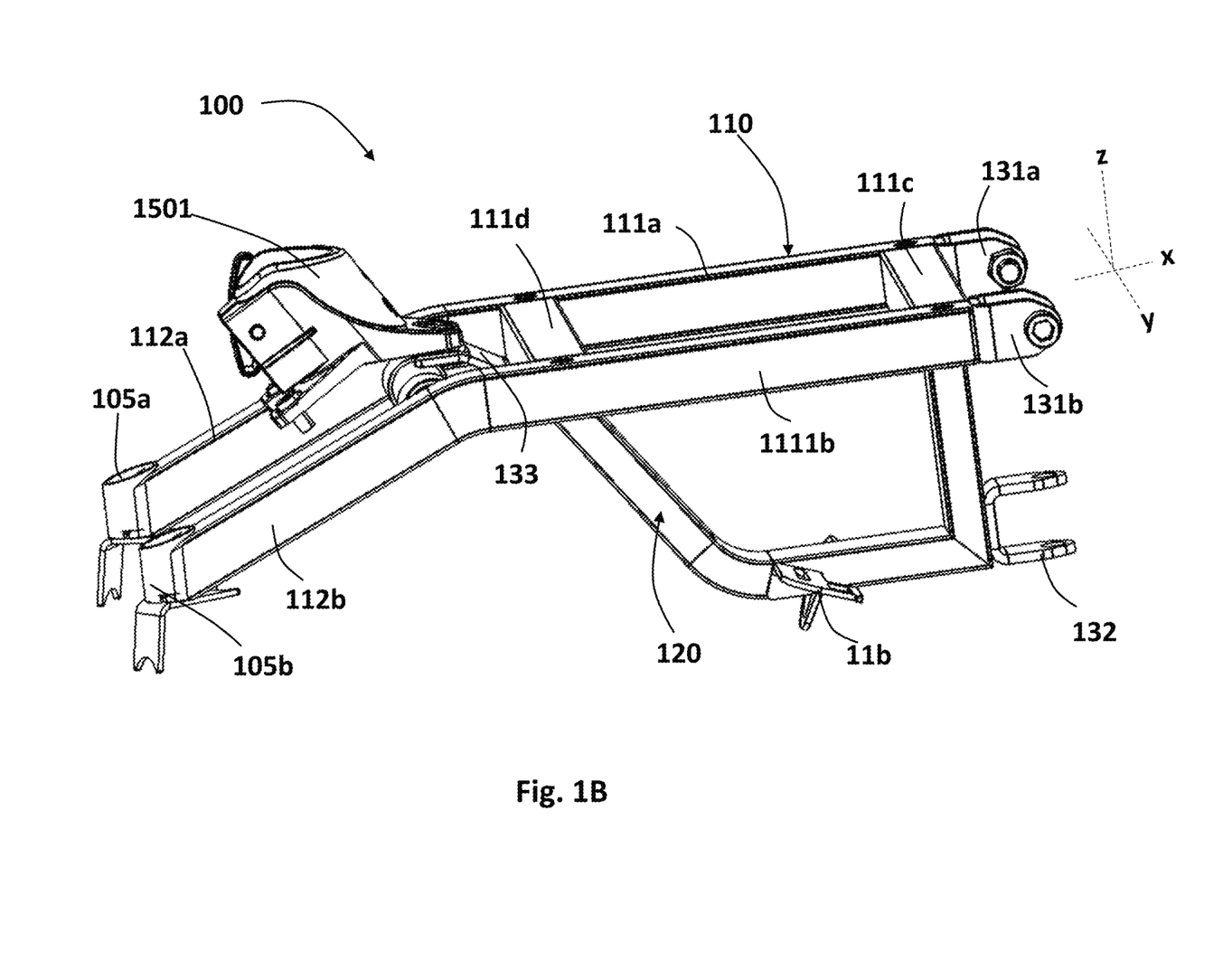
FIG. 1B shows a side view of the tow dolly.

Reference is now made to FIG. 1A and FIG. 1B, showing a connector device 100 for connecting a first vehicle to a second vehicle, according to some embodiments.

As illustrated in FIG. A1 and FIG. 1B, the connector device 100 may include an upper frame 110 and a lower frame 120 fixedly attached to one another. The upper frame 110 may include a main structure 111 formed by several frame members 111a, 111b, 111c and 111d, and arms 112a and 112b extending from a front side of the main structure 111, the arms 112a and 112b may be configured to connect to a rear side of the first vehicle.

The rear side of the main structure 111 may include or connect to one or more catenating pieces such as catenating pieces 131a and 131b configured to connect the connector apparatus 100 to the second vehicle, device or facility, such as to a tow dolly. The two upper catenating pieces 131a and 131b may be configured to enable pivotal movement of the connector device 100 about a first rotation axis parallel to a "y" axis and to a ground plane "xy" over which the vehicle is located.

The rear side of the lower frame 120 may include or connect to one or more lower catenating pieces such as catenating piece 132 which may be configured to enable pivotal movement about a second rotation axis that may be parallel to a "z" axis, perpendicular to the rotation axis of the upper catenating pieces 131a and 131b ("y" axis").

According to some embodiments, as illustrated in FIG. 1A, each of the arms 112a, 112b may be connectable to the vehicle via a respective connecting plate 106a, 106b e.g. configured for attaching to a rear part of a frame of the first vehicle via threaded bolts or screws passed through edges 105a, 105b of the arms 112a, 1121b, respectively.

Another specially designed connecting element 133 may be attachable to a rear frame member 111d of the upper frame's main structure 111 for receiving therethrough an elongated element serving as a base of a driver seat of the first vehicle.

According to some embodiments, the connector device 100 may also include one or more guiding elements for enabling guiding thereby/therethrough cables and/or wires that are to be disposed between the first and second vehicles. For example, one or more guiding elements such as guiding elements 11a and 11b may be connected to the lower frame 120 of the connector device 100.

Reference is made to FIG. 2 and FIGS. 3A-3C showing a 6-wheels vehicles set 3000, according to some embodiments. The vehicles set 3000 may form a 6-wheels' vehicle including a 4-wheels road first vehicle 1000 e.g. having a 4-wheels drive (4×4), as the first vehicle, connected to a two-wheels motorized tow dolly 2000, at its rear side, via the connector device 100, the tow dolly 2000 serving as the second vehicle.

Figure 2:
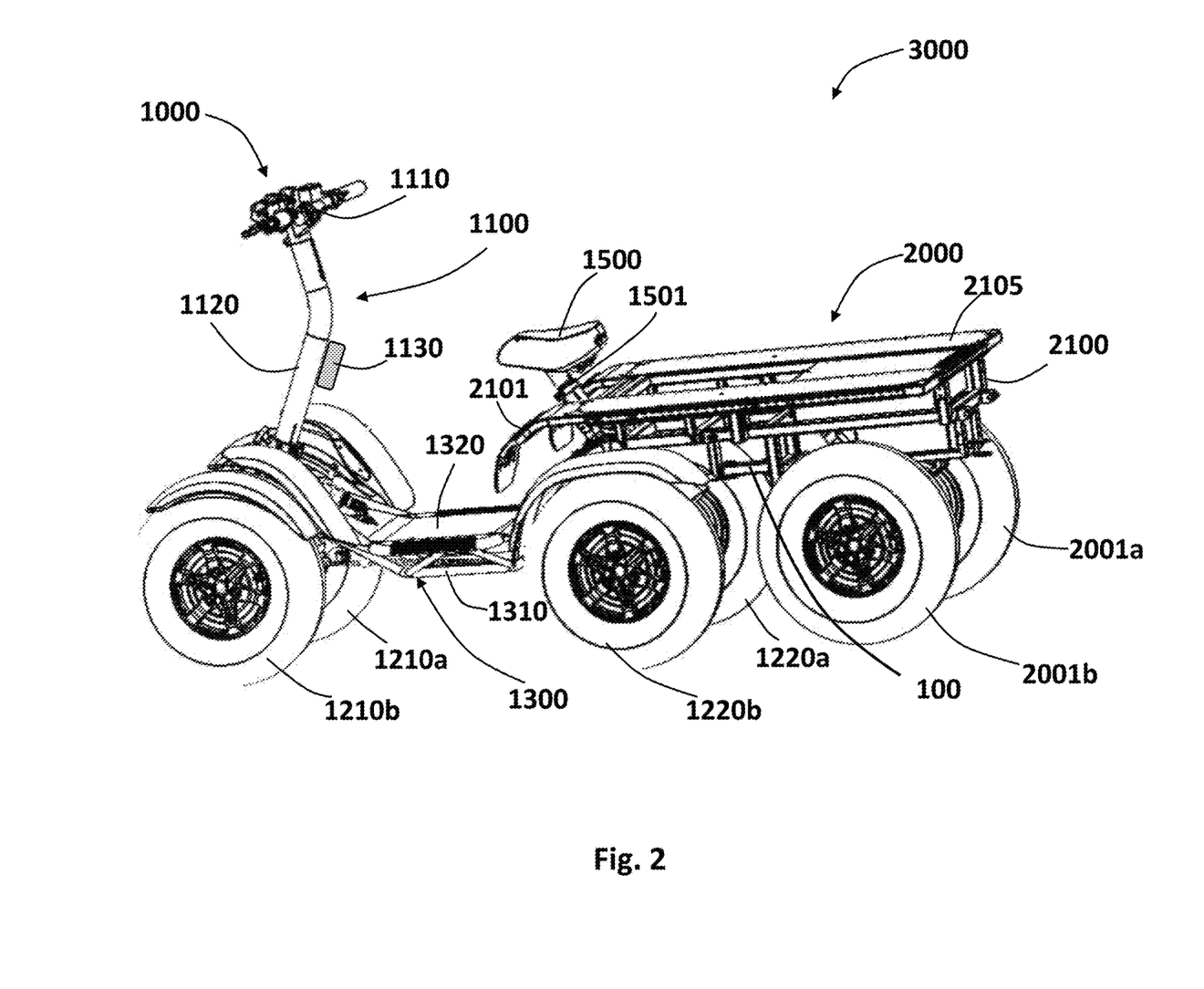
FIG. 2 shows a vehicle set including 4×4 road vehicle connected to a motorized tow dolly at its rear side via the connector device illustrated in FIGS. 1A and 1B, according to some embodiments.

According to some embodiments, the first vehicle 1000 may include:
  4 wheels: 1210a, 1210b, 1220a and 1220b;
  4 motors, such that each of the wheels 1210a, 1210b, 1220a and 1220b may be driven via a separate motor. For example, the vehicle's rear wheels 1220a and 1220b may be respectively and separately driven by motors 1005c and 1005d;
  a carrier assembly 1300 for carrying thereover a driver and/or any other load, the carrier assembly 1300 including a chassis framing structure 1310 and a carrier platform 1320 over which the driver may stand/sit, and/or a load may be placed;
  a steering assembly 1100 including at least: (i) a handlebar 1110 for enabling a driver to steer and control other driving-related functions of the vehicle 1000; (ii) an elongated connecting element 1120 configured and positioned for connecting the handlebar 1110 to the framing structure 1310 of the vehicle 1000; and (iii) a control unit 1130, which may be configured for one or more of: enabling a user such as a driver to input control commands (e.g. by modes selection) for controlling the vehicle/vehicle set 1000/3000; providing indication to one or more characteristics of the vehicle/vehicle set 1000/3000, etc.;

one or more power sources such as one or more batteries, e.g. as a battery per motor (not shown); and a driver/rider seat 1500 and a support member 1501 for supporting the seat 1500 and connecting to the connecting element 133 of the connector device 100.

According to some embodiments, the tow dolly 2000 may include:

wheels 2001a and 2001b;

motors 2005a and 2005b, positioned and configured for driving the wheels 2001a and 2001b, respectively.

a carrier assembly 2100 including a (dolly) frame; and a dolly carrier platform 2200, supported by the carrier assembly 2100 and configured for carrying thereover a load.

According to some embodiments, the front side of the dolly 2000 may be connectable to the rear side of the connector device 100 by having the upper side of the carrier assembly 2100 pivotally connectable to the upper catenating pieces 131a and 131b of the connector device 100.

Figure 3A:
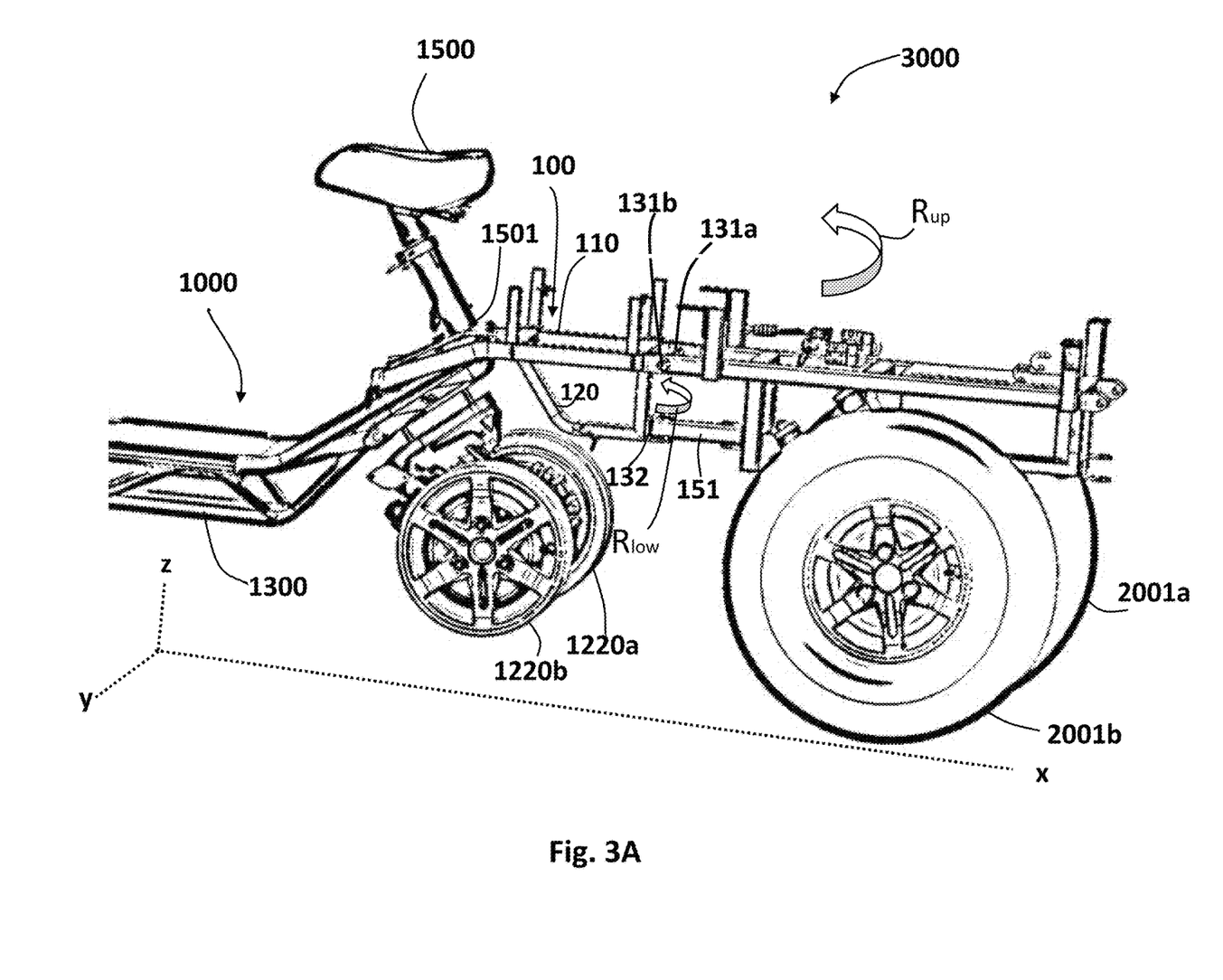
FIG. 3A shows a side view of part of the vehicle set with a lower connecting bar connecting the lower catenating piece of the connector device.
Figure 3B:
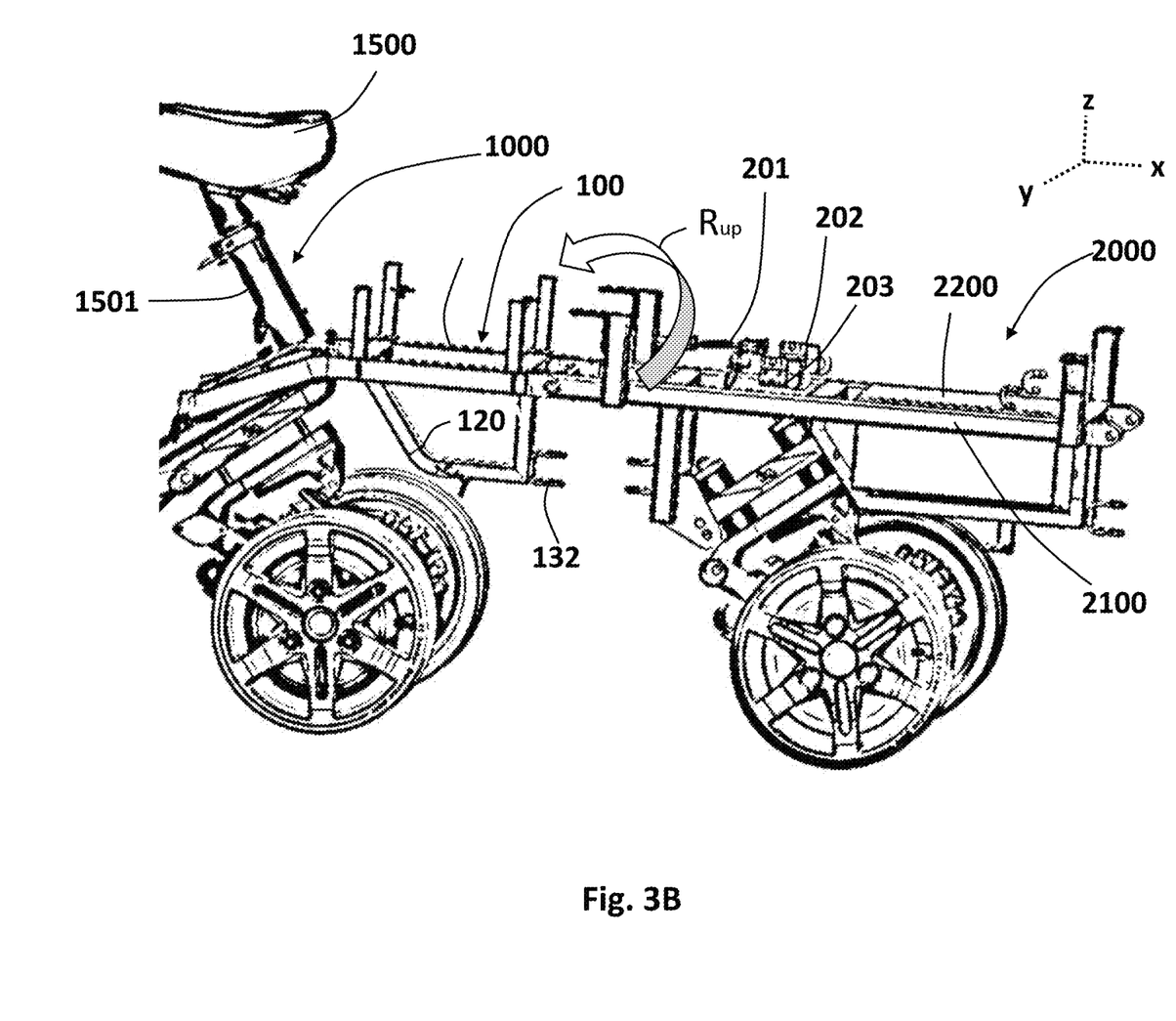
FIG. 3B shows a side partial view of the vehicle set without the lower connecting bar for enabling folding of the dolly towards the vehicle's back side.
Figure 3C:
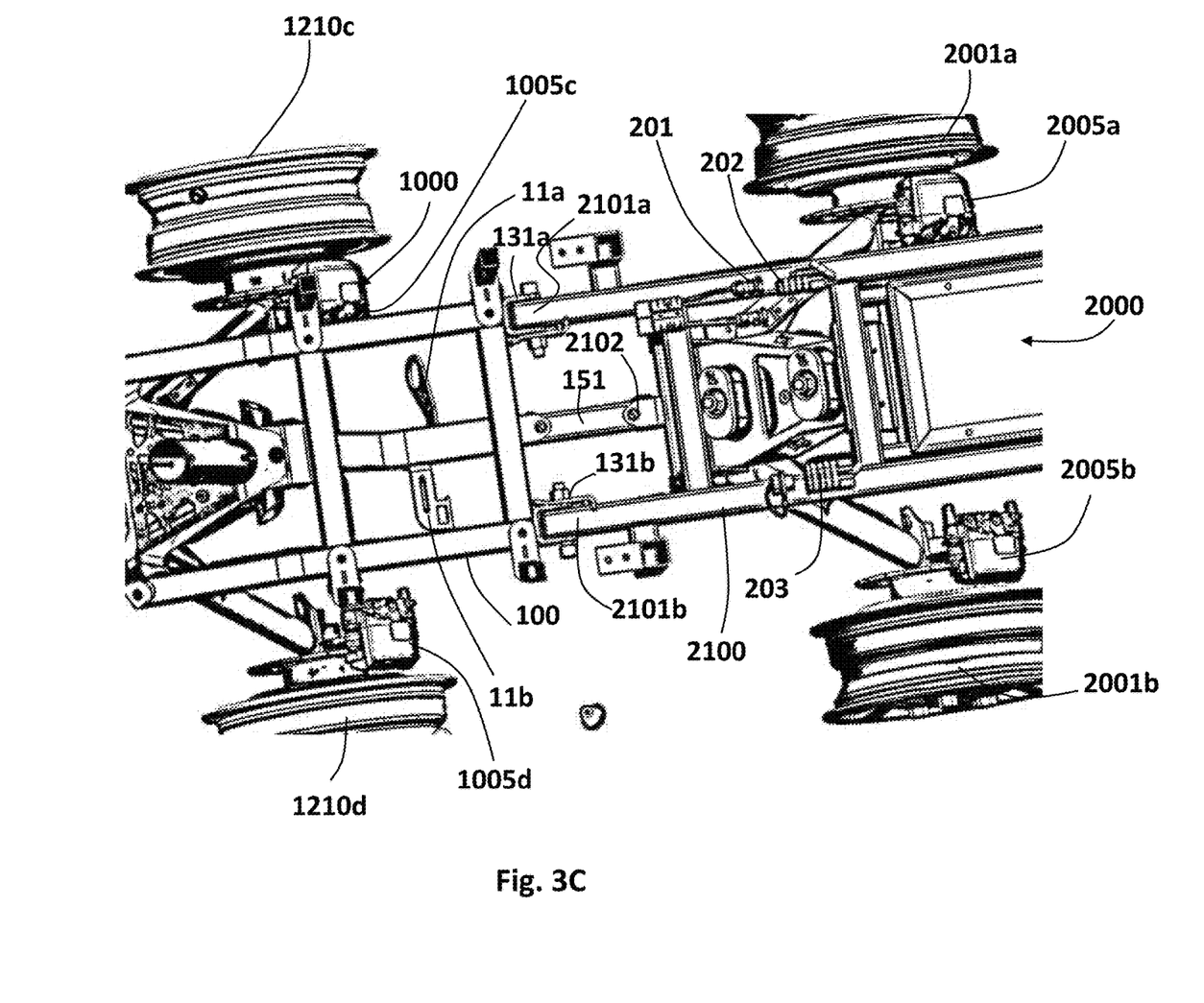
FIG. 3C shows an elevated view of the rear side of the vehicle set for showing some of the connector device's electricity/power guiding holders and wiring connectors' sets, for enabling wired transmittal of commands/current/signals from the vehicle's main control unit to one or more motorized tow dollies connecting thereto, according to some embodiments.

According to some embodiments, an upper front side of the dolly frame 2100 may include two protruding elements 2101a and 2101b, positioned and configured such as to be received inside the upper catenating pieces 131a and 131b, respectively (see FIG. 3C).

According to some embodiments, a lower front side of the dolly frame 2100 may include a protruding element 2102, positioned and configured such as to receive therein a connecting element 151 for pivotally connecting thereof to the lower catenating pieces 132 (see FIG. 3C).

According to some embodiments, the tow dolly 2000 may also include one or more communication connectors such as connectors 201, 202 and 203, for enabling electrical and/or optical signal/current to be transmitted or received to and/or from the control unit 1130 of the first vehicle 1000 e.g. via the control unit 1130.

According to some embodiments, the control unit 1130 of the first vehicle 1000 may include any one or more hardware or software components and/or a combination thereof.

FIGS. 3B and 3A also show how the tow dolly 2000 connects to the connector device through the connector device's upper catenating pieces 131a and 131b such as to enable pivotal movement $R_{up}$ of the tow dolly 2000 about a first axis that is parallel to the "y" axis and the lower catenating piece 132 connects to a lower part of the rear side of the dolly frame 2100 such as to enable pivotal movement $R_{low}$ about a second axis that is parallel to a "z", where axes "y" and "z" and therefore the first and second axes are perpendicular to one another.

As mentioned above, since the upper and lower catenating pieces 131a, 131b and 132 are fixedly attached to the frame 110 of the connector device 100, the rotational movement of the respective upper and lower part of the dolly frame 2100 is restricted or even prevented when all catenating pieces 131a, 131b and 132 are connected to the dolly frame 2100. This means that the angle a between the connector device 100 and the dolly 2000 is either affixed at 180° or can only vary in a span that is fairly close to 180° (e.g. ±5°-10°).

Therefore, to allow folding of the tow dolly 2000 for mounting it over the upper side of the connector device 100 and/or the first vehicle 1000, the connecting element 151 may be removed enabling a rotation of the dolly 2000 about the "y" axis at a much larger rotation span $R_{up}$.

The folding of the tow dolly 2000 towards an upper surface of the connector device 100 and/or the first vehicle 1000 may be done to compactly store the connected vehicles in a storage unit such as in a storage facility and/or in a trunk of a transporting vehicle, for transporting a number of such vehicle sets. The folding of the tow dolly 200 may also be used for allowing the vehicles set 3000 to increase the vehicles set's 3000 agility especially in tough terrain conditions, requiring the relative angle α between the first vehicle 1000 and the tow dolly 2000 to vary between a large angle span (e.g. where a can range between 0° to 300°). The driver/user may be able to manually remove or connect the connecting element 132 for adapting the vehicles set 3000 to the terrain topography, and/or to storage requirements.

According to other embodiments, the connection between the lower catenation piece 132 and the lower front side of the second vehicle may be non-manually controllable (e.g. by using controllable electrical/optical signaling and switching devices) so as to allow easy removal and/or connecting the lower catenation piece 132 e.g. by a switch control.

Additionally or alternatively the upper catenation pieces 131a and 131b may also be disconnected from the upper front side of the tow dolly 2000 for expanding the angle of the rotation movement span $R_{low}$ about the second axis, parallel to the "z" axis, e.g. for adapting the vehicles set 3000 to terrain conditions requiring the vehicles set 3000 to make sharp turns.

Aspects of disclosed embodiments pertain to a modular vehicles set, configured to chain-tow a series of additional vehicles such as a series of tow dollies driven by a first vehicle, where the additional vehicles can be of the same configuration and type or of different configurations and types, and where the connection between each pair of consecutive connected additional vehicles may be of the same or of different configuration and/or type. The first vehicle may be connected to the second additional vehicle (the first towed vehicle) through a connector device as described above, or via any other connection mechanism.

In some embodiments all the towed additional vehicles may be motorized, each having one or more motors controllable via a control unit of the first towing vehicle.

According to some embodiments, some of the towed additional vehicles may be un-motorized where at least some of them may be used for carrying spare and/or additional batteries, for powering the first vehicle and/or for carrying spare batteries load.

According to some embodiments, the first vehicle may be chain connected to one or more motorized additional vehicles in a manner that allows controlling all motors/batteries electrical potential (equipotentiality)/current/power/flux rectification.

According to some embodiments, the motors of the first and/or additional vehicles chain-connected thereto may include electric motors such as direct-current (DC) motors that can be directly powered by batteries, or alternating-current (AC) motors that can be powered via batteries by using one or more rectifiers.

EXAMPLES

Example 1 is a connector device for connecting a first vehicle to a second vehicle, the connector device comprising:

an upper frame configured for connecting at a front side thereof to an upper rear part of the first vehicle and for connecting at a rear side thereof to a front upper side of the second vehicle; and a lower frame configured for connecting at a rear side thereof to a front lower side of the second vehicle, wherein the upper frame is fixedly attachable to the lower frame, wherein the rear side of the upper frame is configured to pivotally connect to the front upper side of the second vehicle, about a first rotation axis "x", and wherein the rear side of the lower frame is configured to pivotally connect to the front lower side of the second vehicle, about a second rotation axis "y" that is angular in respect to the first rotation axis "x" such that the first and second axes have a non-zero angle therebetween.

In example 2, the subject matter of example 1 may include, wherein the non-zero angle between the first and second rotation axes, restricts a freedom of rotational movement about the first axis and/or the second axis.

In example 3, the subject matter of any one or more of examples 1 to 2 may include 1 to 2, wherein the connector device further comprises at least one connecting element, for removable additional attaching of the lower frame to the second vehicle such as to further restrict or prevent the rotation of the second vehicle in respect to the connector device about the first axis "x", for restricting or preventing folding of the second vehicle by rotating thereof about the first axis "x" when required by removing or loosening of the attachment of the connecting element to the second vehicle and/or to the connector device and enabling folding of the second vehicle over the connector device by tightening or attachment of the connecting element to the second vehicle and/or to the connector device.

In example 4, the subject matter of any one or more of examples 1 to 3 may include, wherein the upper frame and lower frame, each comprises catenating pieces for pivotally connecting the upper and lower frames to the first and/or second vehicle.

In example 5, the subject matter of any one or more of examples 1 to 4 may include, wherein the first rotation axis "x" is perpendicular to the second rotation axis "y".

In example 6, the subject matter of any one or more of examples 1 to 5 may include, wherein the connector device further comprises a connecting element configured and located to attach to the upper frame, for receiving therethrough an elongated element serving as a base of a driver seat of the first vehicle.

Example 7 is a vehicle set comprising at least:
(i) a first vehicle comprising at least:
multiple wheels;
a steering assembly configured to enable steering at least of the first vehicle;
a carrier assembly configured for carrying thereover a load; and
at least one motor operatively configured for driving at least one of the wheels;
a control unit configured for controlling the driving at least of the first vehicle; and
one or more power sources;
(ii) at least one other vehicle having multiple wheels and a carrier assembly for carrying a load thereover; and
(iii) at least one connector device for moveably connecting vehicles to one another, each connector device used for connecting two different vehicles of the vehicles set, wherein each connector device comprises at least:

an upper frame configured for connecting at a front side thereof to an upper rear part of a vehicle and for connecting at a rear side thereof to a front upper side of another vehicle; and a lower frame configured for connecting at a rear side thereof to a front lower side of the other vehicle, wherein all vehicles of the vehicles set are removably connectable to one another via a different connecting device, wherein the rear side of the upper frame is configured to pivotally connect to the front upper side of the other vehicle, about a first rotation axis, and the rear side of the lower frame is configured to pivotally connect to the front lower side of the other vehicle, about a second rotation axis that is angular in respect to the first rotation axis such that the first and second axes have a non-zero angle therebetween.

In example 8, the subject matter of example 7 may include, wherein at least one of the at least one other vehicle comprises two or more wheels and a carrier assembly for carrying a load thereover.

In example 9, the subject matter of example 8 may include, wherein at least one of the at least one other vehicle further comprises one or more of:
at least one motor operatively associated with one or more wheels of the respective other vehicle;
at least one power supply for operating the at least one motor;
one or more connecting elements for connecting to one or more other vehicles via one or more connector devices.

In example 10, the subject matter of any one or more of examples 7 to 9 may include, wherein the non-zero angle between the first and second rotation axes, restricts a freedom of rotational movement about the first axis and/or the second axis.

In example 11, the subject matter of any one or more of examples 7 to 10 may include, wherein the connector device further comprises at least one connecting element, for removable additional attaching of the lower frame to the second vehicle such as to further restrict or prevent the rotation of the second vehicle in respect to the connector device about the first axis "x", for restricting or preventing folding of the second vehicle by rotating thereof about the first axis "x" when required by removing or loosening of the attachment of the connecting element to the second vehicle and/or to the connector device and enabling folding of the second vehicle over the connector device by tightening or attachment of the connecting element to the second vehicle and/or to the connector device.

In example 12, the subject matter of any one or more of examples 7 1 to 11 may include, wherein the upper frame and lower frame, of the connector device, each comprises catenating pieces for pivotally connecting the upper and lower frames to the first and/or second vehicle.

In example 13, the subject matter of any one or more of examples 7 to 12 may include, wherein the first rotation axis "x" is perpendicular to the second rotation axis "y".

In example 14, the subject matter of any one or more of examples 7 to 13 may include, wherein the connector device further comprises a connecting element configured and located to attach to the upper frame, for receiving therethrough an elongated element serving as a base of a driver seat of the first vehicle.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments and/or by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Although the invention has been described in detail, nevertheless changes and modifications, which do not depart from the teachings of the present invention, will be evident to those skilled in the art. Such changes and modifications are deemed to come within the purview of the present invention and the appended claims.

The system, module, unit, device etc. or parts thereof, may be programmed to perform particular functions pursuant to computer readable and executable instructions, rules, conditions etc. from programmable hardware and/or software based execution modules that may implement one or more methods or processes disclosed herein, and therefore can, in effect, be considered as disclosing a "special purpose computer" particular to embodiments of each disclosed method/process.

Additionally or alternatively, the methods and/or processes disclosed herein may be implemented as a computer program that may be tangibly or intangibly embodied by a special purpose computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with connector devices, systems, platforms, methods, operations and/or processes discussed herein.

It is noted that the term "and/or" between the last two members of a list of options for selection indicates that a selection of one or more of the listed options is appropriate and may be made.

The number of elements shown in the Figures should not be interpreted as limiting and is used for illustrative purposes only.

Throughout this application, various embodiments may be presented in and/or relate to a range format. It should be understood that the description in range format is merely for convenience and brevity and should not be construed as an inflexible limitation on the scope of the embodiments.

The invention claimed is:

1. A connector device for connecting a first vehicle to a second vehicle, the connector device comprising at least:
    an upper frame configured for connecting at a front side thereof to an upper rear part of the first vehicle and for connecting at a rear side thereof to a front upper side of the second vehicle; and
    a lower frame configured for connecting at a rear side thereof to a front lower side of the second vehicle, wherein the upper frame is fixedly attachable to the lower frame,
    wherein the rear side of the upper frame is configured to pivotally connect to the front upper side of the second vehicle, about a first rotation axis "x", and wherein the rear side of the lower frame is configured to pivotally connect to the front lower side of the second vehicle, about a second rotation axis "y" that is angular in respect to the first rotation axis "x" such that the first and second axes have a non-zero angle therebetween, and
    further comprising at least one connecting element, for removably attaching of the lower frame to the second vehicle such as to restrict or prevent the rotation of the second vehicle in respect to the connector device about the first axis "x", for restricting or preventing folding of the second vehicle by rotating thereof about the first axis "x" when required, by removing or loosening of the attachment of the connecting element to the second vehicle and/or to the connector device and enabling folding of the second vehicle over the connector device by tightening or attachment of the connecting element to the second vehicle and/or to the connector device.

2. The connector device of claim 1, wherein the non-zero angle between the first and second rotation axes, restricts a freedom of rotational movement about the first axis and/or the second axis.

3. The connector device of claim 1, wherein the upper frame and lower frame, each comprises catenating pieces for pivotally connecting the upper and lower frames to the first and/or second vehicle.

4. The connector device of claim 1, wherein the first rotation axis "x" is perpendicular to the second rotation axis "y".

5. The connector device of claim 1, further comprising a connecting element configured and located to attach to the upper frame to the first vehicle.

6. A vehicle set comprising at least:
(i) a first vehicle comprising at least:
multiple wheels;
a steering assembly configured to enable steering at least of the first vehicle;
a carrier assembly configured for carrying thereover a load; and
at least one motor operatively configured for driving at least one of the wheels;
a control unit configured for controlling the driving at least of the first vehicle; and
one or more power sources;
(ii) at least one other vehicle having multiple wheels and a carrier assembly for carrying a load thereover; and
(iii) at least one connector device characterized by being configured to moveably connect vehicles to one another, each connector device comprises at least:
an upper frame configured for connecting at a front side thereof to an upper rear part of a vehicle and for connecting at a rear side thereof to a front upper side of another vehicle; and
a lower frame configured for connecting at a rear side thereof to a front lower side of the other vehicle,
wherein all vehicles of the vehicles set are removably connectable to one another via a different connecting device,
wherein the rear side of the upper frame is configured to pivotally connect to the front upper side of the other vehicle, about a first rotation axis, and the rear side of the lower frame is configured to pivotally connect to the front lower side of the other vehicle, about a second rotation axis that is angular in respect to the first rotation axis such that the first and second axes have a non-zero angle therebetween,
wherein the connector device comprises at least one connecting element, for removably attaching of the lower frame to the second vehicle such as to restrict or prevent the rotation of the second vehicle in respect to the connector device about the first axis "x", for restricting or preventing folding of the second vehicle by rotating thereof about the first axis "x" when required, by removing or loosening of the attachment of the connecting element to the second vehicle and/or to the connector device and enabling folding of the second vehicle over the connector device by tightening or attachment of the connecting element to the second vehicle and/or to the connector device.

7. The vehicles set of claim 6, wherein at least one of the at least one other vehicle comprises two or more wheels and a carrier assembly for carrying a load thereover.

8. The vehicles set of claim 7, wherein at least one of the at least one other vehicle further comprises one or more of:
at least one motor operatively associated with one or more wheels of the respective other vehicle;
at least one power supply for operating the at least one motor;
one or more connecting elements for connecting to one or more other vehicles via one or more connector devices.

9. The vehicles set of claim 6, wherein the non-zero angle between the first and second rotation axes, restricts a freedom of rotational movement about the first axis and/or the second axis.

10. The vehicles set of claim 6, wherein the upper frame and lower frame of the connector device, each comprises catenating pieces for pivotally connecting the upper and lower frames to the first and/or second vehicle.

11. The vehicles set of claim 6, wherein the first rotation axis "x" is perpendicular to the second rotation axis "y".

12. The vehicles set of claim 6, wherein the connector device further comprises a connecting element configured and located to attach to the upper frame to the first vehicle.

* * * * *